July 7, 1931.   R. M. JOHNSON   1,813,878
FLAP BRANDING MACHINE
Filed Oct. 1, 1929   2 Sheets-Sheet 2

Inventor
Ray M. Johnson.
Attorney

Patented July 7, 1931

1,813,878

UNITED STATES PATENT OFFICE

RAY M. JOHNSON, OF AKRON, OHIO, ASSIGNOR TO THE GOODYEAR TIRE & RUBBER COMPANY, OF AKRON, OHIO, A CORPORATION OF OHIO

FLAP BRANDING MACHINE

Application filed October 1, 1929. Serial No. 396,451.

This invention relates to marking machines and its has particular relation to a machine for branding tire flaps.

An object of the invention is to provide a machine for branding tire flaps that is more economical and more efficient than the machines previously employed.

Since the invention described herein is used principally for marking or branding tire flaps, it will be helpful, in understanding the characteristics of the invention, to explain briefly the method of manufacturing tire flaps. Ordinarily several plies of fabric are superposed in flat assembly, the material is then wound about the peripheral surface of a drum and removed to a heater for curing. After curing, the material is cut into tire flaps of proper length and they are then marked for identification. By winding the flaps about the peripheral surface of the drum they are longitudinally curved to correspond substantially to the curvature of a tire casing.

Heretofore, machines for marking or branding tire flaps included a flat stamp, but this construction was very unsatisfactory due to the longitudinal curvature of the flap. When applying a stamp of this construction upon a flap, the plies of fabric cannot adjust themselves to compensate for the pressure applied by the stamp and consequently numerous plaits appear on the surface of the flap adjacent the stamp which results in a very unsatisfactory marking or brand.

According to this invention, a machine for branding flaps is provided including a table, a stamp, and means for protecting the flap from the heat of the stamp, all of which are curved to conform to the longitudinal curvature of the flaps. When applying the stamp in a machine of this construction upon the tire flap, the surface of the flap adjacent the stamp is smooth which results in a mark that is very satisfactory and highly desirable.

For a better understanding of the invention, reference may now be had to the accompanying drawings, forming a part of this disclosure, in which.

Figure 1:
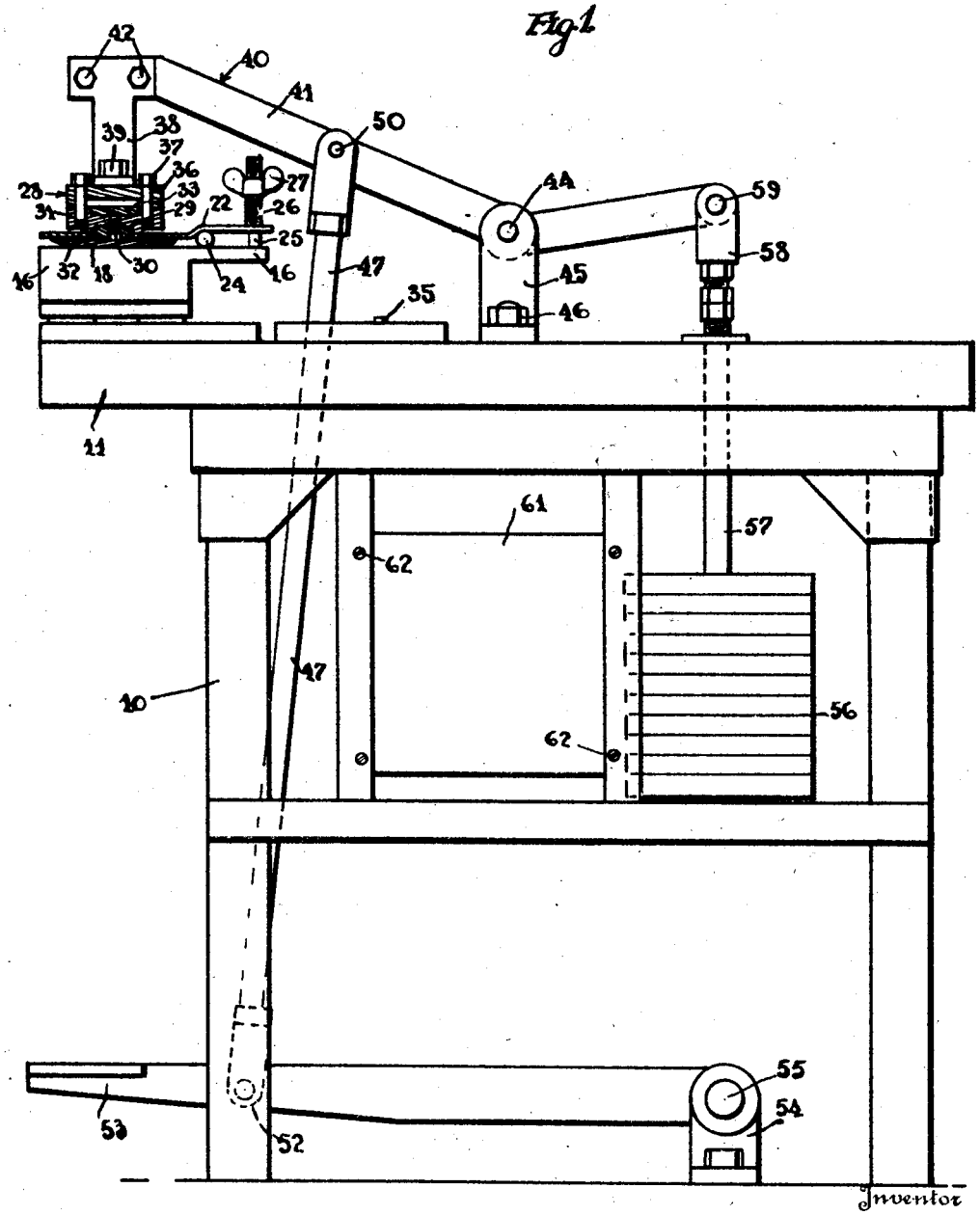
Fig. 1 is a side elevational view of an apparatus embodying the novel features of the invention.
Figure 2:
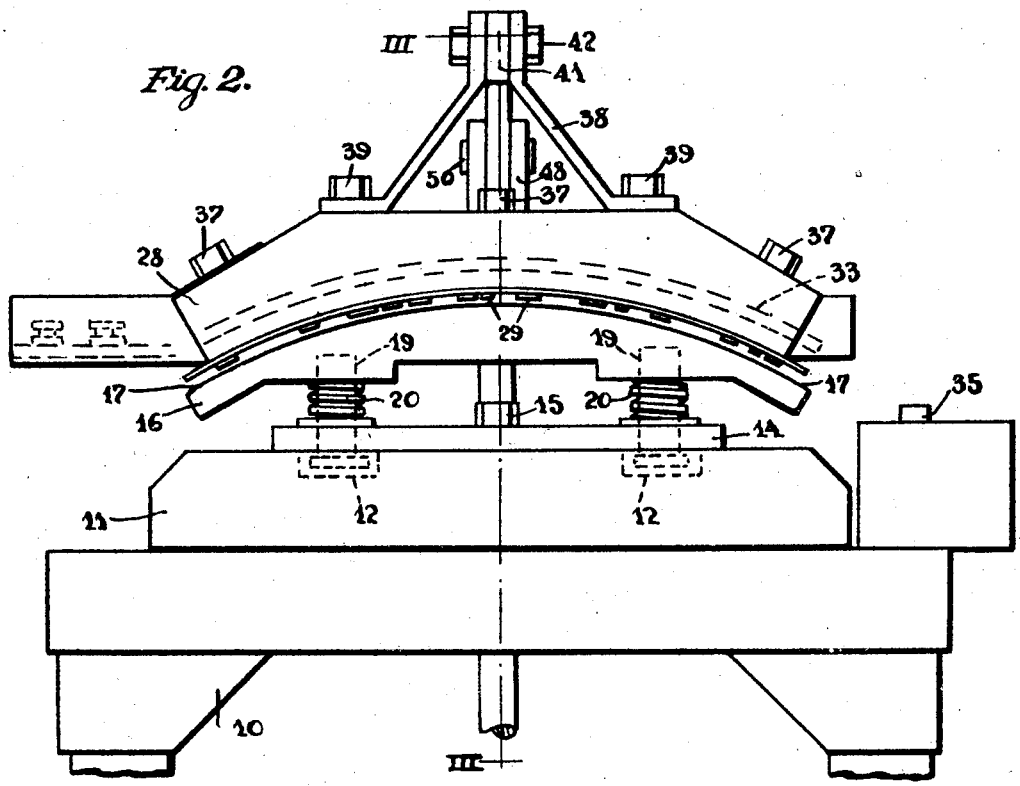
Fig. 2 is a fragmentary front elevational view, on a larger scale of a portion of the apparatus.
Figure 3:
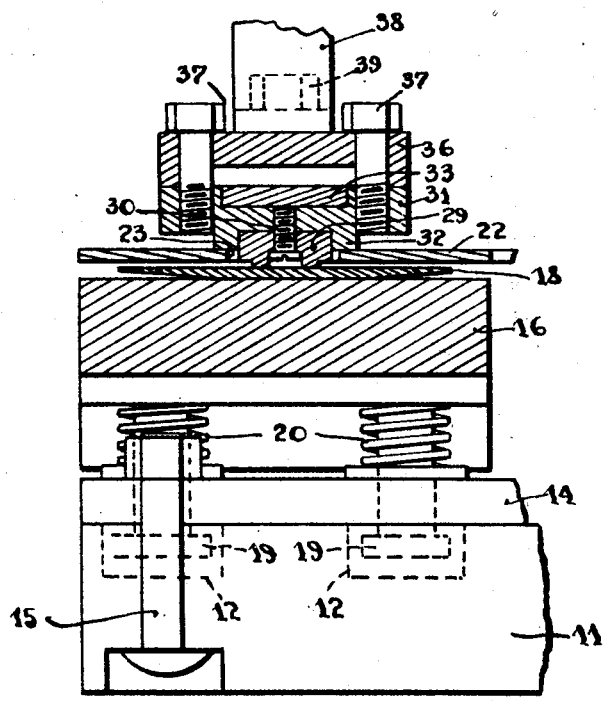
Fig. 3 is a cross-sectional view, on a larger scale, taken substantially along line III—III of Fig. 2.

In the embodiment of the invention illustrated in the accompanying drawings, a frame 10 supports a base 11 having recesses 12 therein, and a plate 14 is secured to the base 11 by means of bolts 15. A table 16, having a curved surface 17 adapted to support a flap 18, is yieldably supported above the plate 14 by means of bolts 19 and springs 20. The recesses 12 and spring 20 are so disposed that when pressure is applied on the flap 18, the table moves downwardly thereby providing a uniform pressure upon the flap.

A plate 22, having an opening 23, is mounted on a rod 24 and is movably secured to the table 16 by means of bolts 25, springs 26 and thumb nuts 27. Normally the plate is elevated above the table 16 to allow for applying the flap 18. A branding device 28 comprising a stamp 29 secured by means of bolts 30 to a stamp holder 31 having shouldered portions 32, is disposed adjacent the plate 22. A heating element 33 is connected to a switch 35 by means of wires (not shown) and mounted in the stamp holder 31 which is secured to a plate 36 by means of bolts 37. Struts 38, secured to the plate 36 by means of bolts 39, are adapted to carry one end of an operating device 40.

The operating device 40 comprises a lever 41, one end of which is secured between the struts 38 by means of bolts 42 and is pivotally supported as indicated at 44 intermediate its ends upon a bracket 45 which is mounted on the base 11 by means of bolts 46. A rod 47 is secured at one end to the lever 41 by means of a pin 50 and secured at its other end by means of a pin 52 to a pedal 53 which is movably mounted in a bracket 54 by means of a pin 55. A weight 56 is attached to a rod 57 which is secured to the end of the rod 41 by means of a pin 59. The weight is so arranged that normally the stamping device will be elevated above the table 11.

A conventional rheostat 61 that is provided to prevent overheating of the stamp 29 is secured to the frame 10 by means of screws 62, and is connected to the heating element 33 and switch 35 by wires (not shown).

In operating the machine, the flap 18 is placed upon the curved surface 17 of the table 16. The branding device 28 and the plate 22 normally disposed above the flap, are actuated by the pedal 53 of the operating device 40 and placed over the flap, whereupon the brand is applied to the flap. The plate 22, moving down upon the flap flattens and smoothes it, with the opening 23 of the plate 22 so positioned that only the letters and figures of the stamp projecting through the opening will be marked upon the flap. The portions 32 of the stamp holder 31 rest upon the plate 22 and assure uniform branding of the flaps.

Although I have illustrated only the preferred form which the invention may assume and have described that form in detail, it will be apparent to those skilled in the art that the invention is not so limited but that various modifications may be made therein without departing from the spirit of the invention or from the scope of the appended claims.

What I claim is:

1. A branding machine comprising a yieldable support for engaging a material to be branded, a stamp movable to press the material against the support, means for heating the stamp and means for protecting the material.

2. A branding machine comprising a yieldable support for engaging a material to be branded, a stamp movable to press the material against the support, means for heating the stamp and a recessed plate for presenting a limited area of material to be branded by the stamp.

3. A branding machine comprising a yieldable curved member for supporting a material to be branded, a curved stamp movable to press the material against the member, means for heating the stamp, and means for smoothing the material to be branded.

4. A branding machine comprising a yieldable curved member for supporting a material to be branded, a curved stamp corresponding to the curvature of the member, means for moving the stamp toward the member, and means for presenting a limited confined area of material to be branded by the stamp.

5. A branding machine comprising a frame, a curved support yieldably mounted upon the frame, a curved stamp movable toward the support, a heating element connected to the stamp, a recessed plate mounted between the support and a stamp for smoothing and protecting the area of material to be stamped.

6. A branding machine comprising a support for sheet material to be branded, a stamp mounted for movement into and out of contact with the material, means for heating the stamp and a plate disposed between the stamp and the material and having an opening formed therein to permit the stamp to contact with the surface of the material.

7. A branding machine comprising a resilient support, a plate yieldably mounted above the support and having an opening therein, a die mounted above the latter mentioned member registering with the opening in the member, and means for moving the die into and out of contact with material disposed upon the yieldable support.

In witness whereof, I have hereunto signed my name.

Signed at Akron, in the county of Summit and State of Ohio, U. S. A., this 30 day of September, 1929.

RAY M. JOHNSON.